US012769385B2

(12) United States Patent
Miyanaga

(10) Patent No.: US 12,769,385 B2
(45) Date of Patent: Oct. 20, 2026

(54) POWER MANAGEMENT CIRCUIT

(71) Applicant: ROHM CO., LTD., Kyoto (JP)

(72) Inventor: Koichi Miyanaga, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 60 days.

(21) Appl. No.: 18/441,369

(22) Filed: Feb. 14, 2024

(65) Prior Publication Data

US 2024/0184352 A1 Jun. 6, 2024

Related U.S. Application Data

(63) Continuation of application No. PCT/JP2022/031180, filed on Aug. 18, 2022.

(30) Foreign Application Priority Data

Aug. 19, 2021 (JP) ................................ 2021-134312

(51) Int. Cl.

*G06F 1/3287* (2019.01)
*G06F 1/24* (2006.01)
*G06F 1/26* (2006.01)
*H02J 1/00* (2026.01)

(52) U.S. Cl.

CPC ................................ *G06F 1/3287* (2013.01)

(58) Field of Classification Search

CPC .. G06F 1/3287; G06F 1/24; G05F 1/26; H02J 1/00

See application file for complete search history.

(56) References Cited

U.S. PATENT DOCUMENTS

2005/0012396 A1* 1/2005 Chidambaram .. H02J 13/00001 307/77
2011/0022826 A1* 1/2011 More .................... G06F 9/4401 713/1
2011/0022859 A1* 1/2011 More .................... G06F 1/3203 713/300
2015/0199520 A1* 7/2015 Woolley .................. G06F 21/57 713/2
2015/0370296 A1* 12/2015 Purcell .................. G06F 11/221 714/43
2019/0179789 A1* 6/2019 Ohnuma ............. G06F 13/4081
2020/0050252 A1* 2/2020 Rowley ................. G06F 3/0625

FOREIGN PATENT DOCUMENTS

JP 2009181380 A 8/2009
JP 2013182603 A 9/2013
JP 6285779 B2 2/2018

OTHER PUBLICATIONS

PCT International Preliminary Report on Patentability issued on Feb. 13, 2024, with Written Opinion of the ISA and International Search Report; Date of Mailing, Oct. 4, 2022; 15 pages.

* cited by examiner

*Primary Examiner* — Jaweed A Abbaszadeh
*Assistant Examiner* — Gayathri Sampath
(74) *Attorney, Agent, or Firm* — CANTOR COLBURN LLP

(57) ABSTRACT

A sequencer includes a logic circuit capable of controlling a plurality of power supply circuits to be activated or shut down. An event signal Sig is input to each of the at least one control pin EVT. An operation of the sequencer can be set according to setting data CONFIG stored in a nonvolatile memory.

14 Claims, 8 Drawing Sheets

POWER MANAGEMENT CIRCUIT

CROSS-REFERENCE TO RELATED APPLICATION

The present invention is a continuation of International Application No. PCT/JP2022/031180, filed Aug. 18, 2022, which claims priority to Japanese Patent Application No. 2021-134312, filed on Aug. 19, 2021, the entire contents of which are incorporated herein by reference.

BACKGROUND

1. Technical Field

The present disclosure relates to a power management circuit that manages and controls a plurality of power supplies.

2. Description of the Related Art

Each of mobile phones, tablet terminals, notebook personal computers (PCs), desktop PCs, and game devices includes a microprocessor such as a central processing unit (CPU) or a graphics processing unit (GPU) that performs arithmetic processing.

An electronic device on which a microprocessor is mounted is subdivided into a plurality of circuit blocks in accordance with a delicate semiconductor manufacturing process, an increase in the number of peripheral circuits to be mounted, and a demand for low power consumption, and is configured to be able to control a power supply voltage independently for each of the circuit blocks.

In such a device, a power management integrated circuit (PMIC) is used to control a plurality of power supply systems corresponding to the plurality of circuit blocks. The PMIC is required to reliably control the plurality of power supplies to be turned on or off according to a predetermined sequence.

The PMIC includes a plurality of power supply circuits (power supply lanes) and a sequencer that controls the power supply circuits. Mounting a general-purpose microcontroller as a sequencer part causes an increase in cost. Therefore, conventionally, it has been necessary to design a dedicated sequencer in hardware each time so that each electronic device satisfies its required specifications.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Summary of Embodiments

Figure 1:
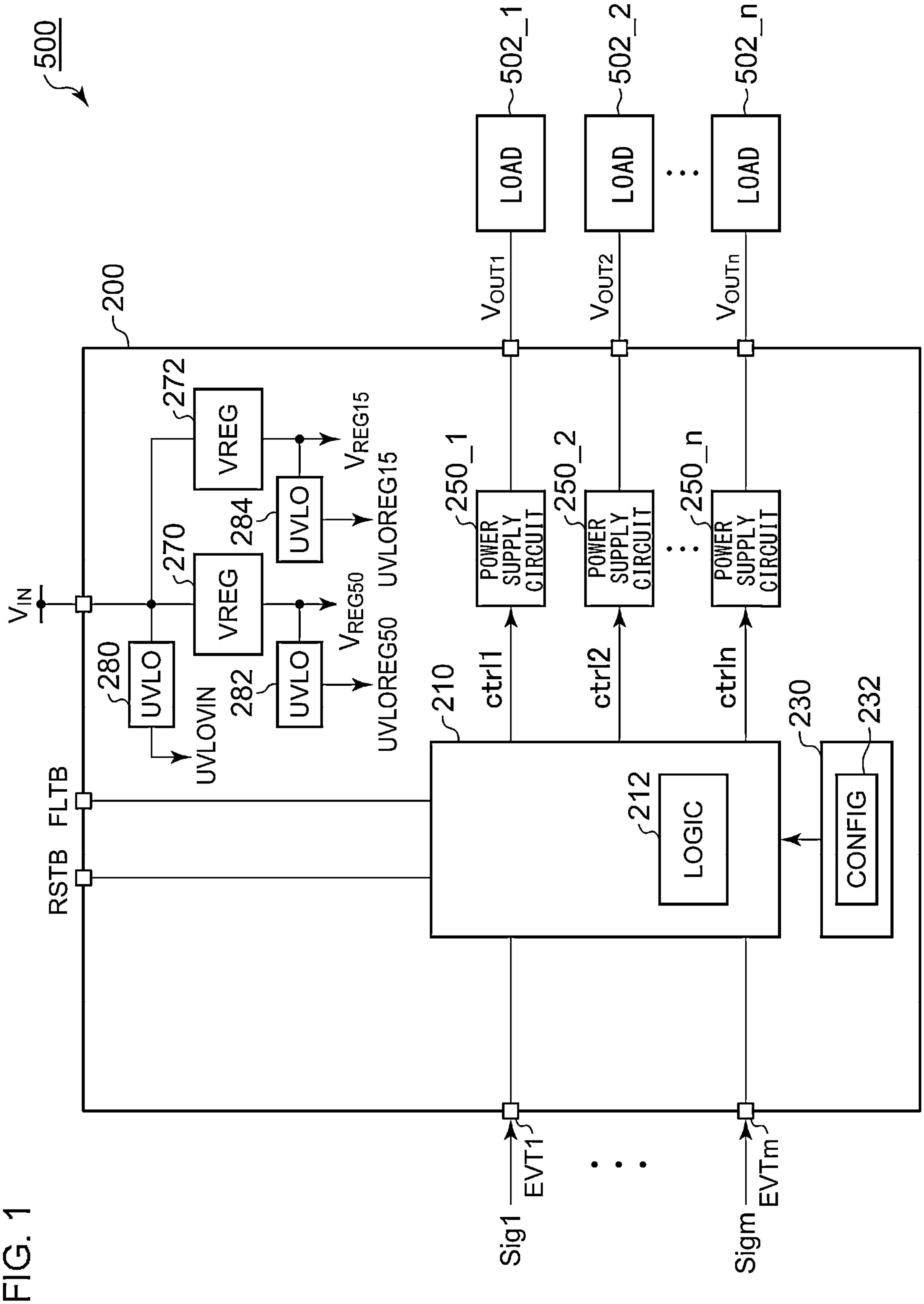
FIG. 1 is a block diagram of an electronic device including a power management integrated circuit according to a first embodiment.

The summary of some exemplary embodiments of the present disclosure will be described. This summary is intended to briefly describe some concepts of one or more embodiments for the purpose of basic understanding of the embodiments as a prelude to the detailed description provided below and does not limit the scope of the invention or disclosure. This summary is not a comprehensive overview of all possible embodiments and is not intended to identify key elements of all embodiments or delineate the scope of some or all aspects. For convenience, the term "one embodiment" may be used to refer to one embodiment (an example or a modification) or a plurality of embodiments (examples or modifications) disclosed in the present specification.

A power management circuit according to one embodiment includes: a sequencer including a logic circuit structured to control a plurality of power supply circuits to be activated or shut down; a nonvolatile memory; and at least one control pin structured to receive at least one event signal. An operation of the sequencer is settable according to setting data stored in the nonvolatile memory.

According to this configuration, it is possible to change at least one of the order in which the plurality of power supply circuits are activated and shut down and the timings when the plurality of power supply circuits are activated and shut down according to the setting data written in the nonvolatile memory, and it is possible flexibly cope with various required specifications.

In one embodiment, the at least one control pin may include a plurality of control pins. The setting data may include first data specifying which one of the plurality of control pins each of the plurality of power supply circuits is assigned to.

In one embodiment, the plurality of control pins may be two control pins.

In one embodiment, the setting data may include second data specifying an activation start timing for each of the plurality of power supply circuits in association with assertion of a corresponding event signal. This makes it possible to change a timing at which each power supply circuit is activated.

In one embodiment, the second data may indicate one of a plurality of time slots based on assertion of the event signal. This makes it possible to simplify a configuration of the sequencer.

In one embodiment, the setting data may include third data specifying a shutdown start timing for each of the plurality of power supply circuits based on negation of a corresponding event signal. This makes it possible to change a shutdown start timing for each power supply circuit.

In one embodiment, the third data may indicate one of a plurality of time slots based on the negation of the event signal. This makes it possible to simplify a configuration of the sequencer.

In one embodiment, the power management circuit may further include a register structured to be accessed by an external controller. The first data may specify which one of the plurality of control pins each of the plurality of power supply circuits is assigned to or is not assigned to. The sequencer may turn on or off a power supply circuit that is not assigned to any of the plurality of control pins according to a value of the register. This makes it possible to arbitrarily turn on or off some of the plurality of power supply circuits during the operation of the electronic device.

In one embodiment, the power management circuit may further include a reset pin. The sequencer may negate a reset signal of the reset pin after the activation of the plurality of power supply circuits is completed. The setting data may include fourth data defining a time until the reset signal is negated after the activation of the plurality of power supply circuits is completed. This makes it possible to supply the reset signal to an external circuit at an appropriate timing after the power supply is set up.

In one embodiment, the at least one control pin may include a plurality of control pins. When a predetermined one of the plurality of control pins is negated, the sequencer may negate the reset signal after a lapse of a predetermined time.

In one embodiment, the power management circuit may further include a fault pin. The sequencer may assert a fault signal of the fault pin after the activation of the plurality of power supply circuits is completed, and the setting data may include fifth data defining a time until the fault signal is asserted after the activation of the plurality of power supply circuits is completed. This makes it possible to notify an external circuit that the activation has succeeded.

In one embodiment, the at least one control pin may include a plurality of control pins. When a predetermined one of the plurality of control pins is negated, the sequencer may negate the fault signal after a lapse of a predetermined time.

In one embodiment, the power management circuit may include at least one timer circuit corresponding to at least one event signal. The at least one timer circuit may start an operation with assertion of the corresponding event signal as a trigger assert a time slot signal at a predetermined plurality of timings, and the plurality of power supply circuits may be associated with one of the plurality of timings generated by the at least one timer circuit.

In one embodiment, the power management circuit may further include the plurality of power supply circuits.

In one embodiment, the power management circuit may be integrated on one semiconductor substrate. The term "integrated into one body" includes a case where all components of the circuit are formed on a semiconductor substrate or a case where main components of the circuit are integrated into one body, and some resistors, capacitors, and the like may be provided outside the semiconductor substrate for adjusting a circuit constant. By integrating the circuits on one chip, the circuit area can be reduced, and the characteristics of the circuit elements can be kept uniform.

EMBODIMENTS

Hereinafter, preferred embodiments will be described with reference to the drawings. The same or equivalent components, members, and processes illustrated in the drawings are denoted by the same reference signs, and redundant description will be omitted as appropriate. Further, the embodiments are not intended to limit the disclosure and the invention but are merely exemplary. All features described in the embodiments and combinations thereof are not necessarily essential to the disclosure and the invention.

In the present specification, "a state in which a member A is connected to a member B" includes not only a case where the member A and the member B are physically and directly connected to each other, but also a case where the member A and the member B are indirectly connected to each other via another member that does not substantially affect such a state where the member A and the member B are electrically connected to each other or that does not impair a function or an effect exhibited by the coupling between the member A and the member B.

Similarly, "a state in which a member C is connected (provided) between the member A and the member B" includes not only a case where the member A and the member C, or the member B and the member C are directly connected to each other, but also a case where the member A and the member B are indirectly connected to each other via another member that does not substantially affect such an electrically connected state or that does not impair a function or an effect exhibited by such coupling.

First Embodiment

FIG. 1 is a block diagram of an electronic device 500 including a power management integrated circuit (PMIC) 200 according to a first embodiment. The electronic device may be a consumer device, an in-vehicle device, or an industrial device.

The PMIC 200 is mounted on the electronic device 500 having a plurality of loads 502_1 to **502_*n*, and supplies appropriate power supply voltages $V_{OUT1}$ to $V_{OUTn}$ to the plurality of loads 502_1 to 502_*n*. The type and the number of loads 502 are not particularly limited. Examples of the plurality of loads 502_1 to 502_*n*** include a central processing unit (CPU), a random access memory (RAM), a hard disk drive (HDD), a solid state drive (SSD), an audio circuit, and a display driver.

For example, some or all of the plurality of loads 502_1 to **502_*n* may be a plurality of blocks (a CPU block and a memory block) provided inside a microcontroller. Alternatively, the plurality of loads 502_1 to 502_*n*** may be separate devices.

In order to normally operate the electronic device 500, it is necessary to activate the plurality of loads 502 in a predetermined order, and thus, it is necessary to correctly control the on/off sequence of the power supply voltages for these components on the order of several microseconds. For example, the power supply to the RAM needs to be completed before the CPU accesses the RAM.

The PMIC 200 mainly includes a sequencer 210, a nonvolatile memory 230, a plurality of power supply circuits 250_1 to **250_*n*, internal regulators 270 and 272, and undervoltage lockout (UVLO) circuits 280, 282, and 284**, and is a functional IC integrally integrated on one semiconductor substrate.

A DC (direct current) input voltage $V_{IN}$ is supplied to an input voltage pin VIN of the PMIC 200. The internal regulator 270 generates a stabilized power supply voltage $V_{REG50}$ of 5 V based on the input voltage $V_{IN}$. The internal regulator 272 generates a stabilized power supply voltage $V_{REG15}$ of 1.5 V based on the input voltage $V_{IN}$.

The UVLO circuits 280, 282, and 284 compare the input voltage $V_{IN}$, the power supply voltage $V_{REG50}$, and the power supply voltage $V_{REG15}$ to corresponding threshold voltages, respectively, to detects an undervoltage lockout state. Signals UVLOVIN, UVLOREG50, and UVLOREG15 indicating results of the comparison performed by the UVLO circuits 280, 282, and 284 are supplied to the sequencer 210.

The PMIC 200 includes at least one (m) control pin EVT. Event signals Sig1 to Sigm related to the state transition of the electronic device 500 are input to respective control pins EVT1 to EVTm.

One of the plurality of event signals Sig1 to Sigm may be a signal generated in association with a press of a main power button, an operation key, or a reset button of the electronic device 500, or may be a certain interrupt request (IRQ).

The plurality of power supply circuits 250_1 to 250_*n* correspond to the plurality of loads 502_1 to 502_*n*. The plurality of power supply circuits 250_1 to 250_*n* are configured to be individually switchable between a turn-on state and a turn-off state. The power supply circuit 250 may be a step-up, step-down, or step-up/down DC/DC converter, a linear regulator such as a low drop output (LDO), a charge pump circuit, or the like. A person skilled in the art understands that some of the components constituting the power supply circuit 250, for example, an inductor, a transformer, a smoothing capacitor, a feedback resistor, and a switching element are constituted by chip components or discrete components and externally attached to the outside of the IC of the PMIC 200.

The sequencer 210 includes a logic circuit 212 that controls the plurality of power supply circuits 250 to be activated or shut down using the plurality of event signals Sig1 to Sigm as triggers. The sequencer 210 can include an analog or digital timer circuit and the like in addition to the logic circuit 212. Control signals ctrl1 to ctrln for controlling the power supply circuits 250_1 to 250_*n* to be started or stopped are supplied from the sequencer 210 to the plurality of power supply circuits 250_1 to 250_*n*, respectively.

The PMIC 200 also includes a reset pin RSTB and a fault pin FLTB. B indicates negative logic, low is assert and high is negate.

The PMIC 200 makes low, that is, asserts a reset signal of the reset pin RSTB and a fault signal of the fault pin FLTB before the activation of all the power supply circuits 250_1 to 250_*n* is completed, and negates the reset signal of the reset pin RSTB and the fault signal of the fault pin FLTB when the activation of all the power supply circuits 250_1 to 250_*n* is completed.

The nonvolatile memory 230 stores setting data CONFIG that specifies an operation of the sequencer 210. The nonvolatile memory 230 is, for example, a one time programmable read only memory (OTPROM) such as a fuse ROM. The nonvolatile memory 230 may be an erasable programmable read only memory (EPROM) such as a flash memory.

The operation of the sequencer 210 can be set according to the setting data CONFIG stored in the nonvolatile memory 230.

The setting data CONFIG will be described in detail below.

The setting data CONFIG may include the following data.

First Data D1

The first data D1 specifies which one of the plurality of control pins EVT1 to EVTm each of the plurality of power supply circuits 250_1 to 250_*n* is assigned to.

For example, the first data D1[*i*] (i=1 to n) indicates which one of the control pins EVT1 to EVTm an i-th power supply circuit 250_*i* is assigned to. When the value of D1[*i*] is x, the power supply circuit 250_*i* is associated with an x-th control pin EVTx.

The sequencer 210 activates the power supply circuit 250_*i* with the assertion of the event signal Sigx as a trigger and shuts down the power supply circuit 250_*i* with the negation of the event signal Sigx as a trigger.

Second Data D2

For each of the plurality of power supply circuits 250_1 to 250_*n*, an activation start timing is specified in association with the assertion of the corresponding event signal EVT.

For example, it is assumed that the i-th power supply circuit 250_*i* is associated with a y-th event signal Sigy. At this time, the second data D2[*i*] (i=1 to n) specifies the activation start timing of the i-th power supply circuit 250_*i* in association with the assertion of the corresponding event signal Sigy.

For example, a plurality of time slots SLOTy_1 to SLOTy_k may be determined in association with the assertion of the event signal Sigy. In this case, the value p of the second data D2[*i*] can take any one of 1 to k. The time slots SLOTy_1 to SLOTy_k may be at temporally equal intervals or at temporally unequal intervals. The intervals of the time slots may also be set by the setting data CONFIG.

The sequencer 210 activates the power supply circuit 250_*i* at the timing of the p-th time slot SLOTy_p based on the assertion of the event signal Sigy.

Third Data D3

For each of the plurality of power supply circuits 250_1 to 250_*n*, a shutdown start timing is specified based on the negation of the corresponding event signal EVT.

For example, it is assumed that the i-th power supply circuit 250_*i* is associated with a y-th event signal Sigy. At this time, the third data D3[*i*] (i=1 to n) specifies the shutdown start timing of the i-th power supply circuit 250_*i* based on the negation of the corresponding event signal Sigy.

For example, a plurality of time slots SLOTy_1 to SLOTy_k are determined based on the negation of the event signal Sigy. In this case, the value q of the third data D3[*i*] can take any one of 1 to k.

The sequencer 210 starts shutting down the power supply circuit 250_*i* at the timing of the q-th time slot SLOTy_q based on the negation of the event signal Sigy.

Fourth Data D4

The fourth data D4 defines a time until the reset signal RSTB is negated after the activation of the plurality of power supply circuits 250_1 to 250_*n* is completed, that is, after the activation of the last power supply circuit 250 is completed.

Fifth Data D5

The fifth data D5 defines a time until the fault signal FLTB is negated after the activation of the plurality of power supply circuits 250_1 to 250_*n* is completed, that is, after the activation of the last power supply circuit 250 is completed.

The above is the basic configuration of the PMIC 200. Next, the operation of the PMIC 200 will be described. In the following description, it is assumed that the number of control pins is m=2, one event signal Sig1 will be referred to as an enable signal EN, and the other event signal Sig2 will be referred to as a wake-up signal WU. In addition, it is assumed that the number n of channels of the PMIC 200 is 4, and power supply voltages $V_{OUT1}$ to $V_{OUT4}$ of four lanes are generated.

Figure 2:
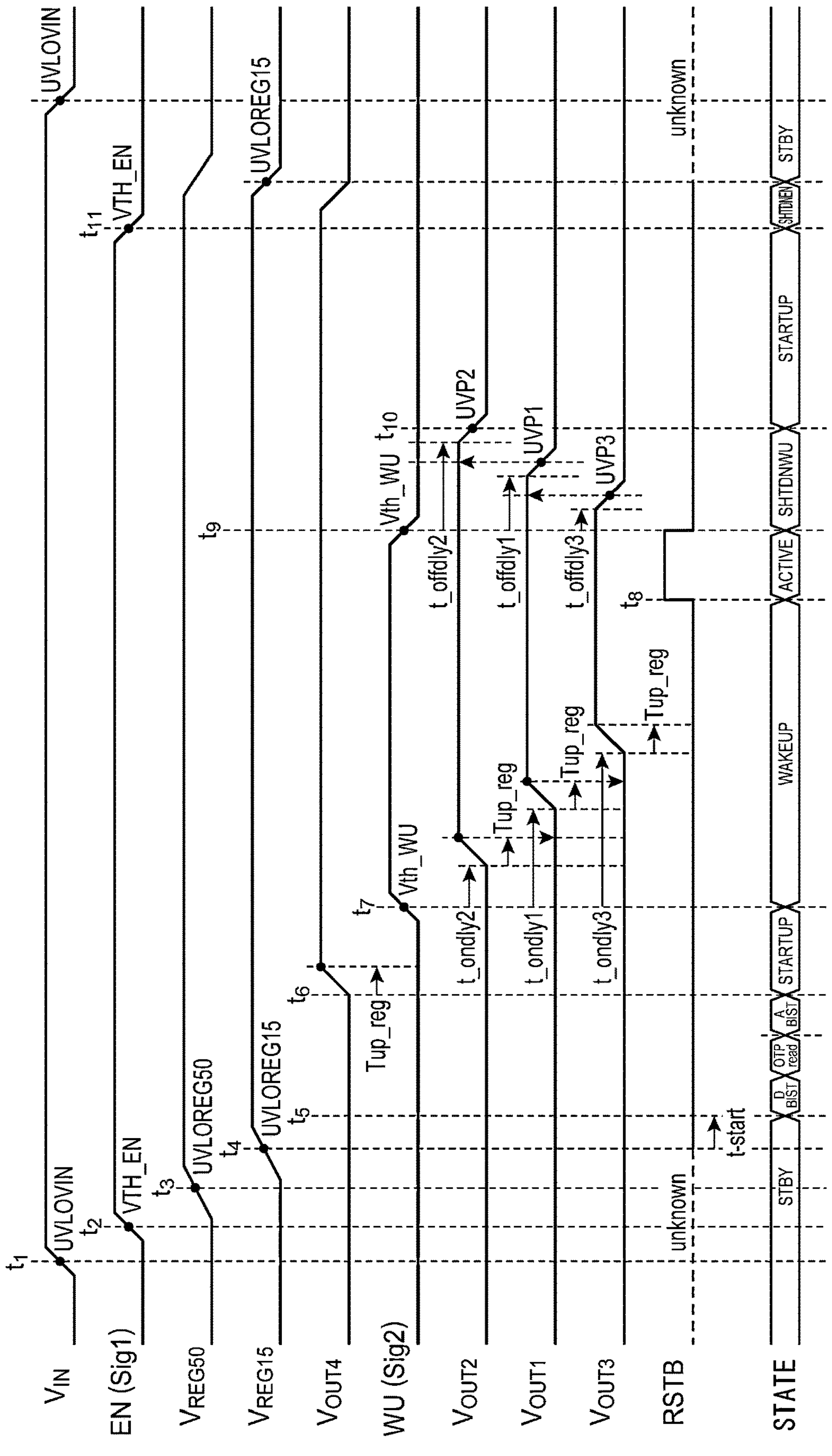
FIG. 2 is a time chart for explaining an operation of the PMIC of FIG. 1.

FIG. 2 is a time chart for explaining the operation of the PMIC 200 of FIG. 1. The PMIC 200 transitions between a plurality of states.

Standby State STBY

Initially, the PMIC 200 is in a standby state STBY. When the input voltage $V_{IN}$ exceeds the threshold value at time $t_1$, a UVLOVIN signal is released.

When the enable signal EN is asserted at time $t_2$, the sequencer 210 activates the internal regulator 270. As a result, the power supply voltage $V_{REG50}$ of 5 V rises, and a UVLOREG50 signal is released at time $t_3$. The sequencer 210 activates the internal regulator 272. As a result, the power supply voltage $V_{REG15}$ of 1.5 V rises, and a UVLOREG15 signal is released at time $t_4$.

After time t-start has elapsed from the release of the UVLOREG15 signal, the PMIC 200 transitions from the standby state STBY to D-BIST state at time $t_5$.

D-BIST State

In the D-BIST state, the PMIC 200 executes a digital built-in self test (BIST). When the PMIC 200 passes the digital BIST, the PMIC 200 enters an OTP load state.

OTP Load State

The sequencer 210 loads the setting data CONFIG from the nonvolatile memory 230.

A-BIST State

In the A-BIST state, the PMIC 200 executes an analog BIST. When the PMIC 200 passes the analog BIST, the PMIC 200 enters a startup state STARTUP at time $t_6$.

Startup State STARTUP

In the startup state, the power supply circuit assigned to the enable pin (enable signal EN) is activated. In this example, among the four-channel power supply circuits 250_1 to 250_4, the fourth power supply circuit 250_4 is assigned to the enable pin EN, and this power supply circuit 250_4 is activated in the startup state. This assignment is based on the first data D1[4] described above.

Wakeup State WAKEUP

When a wake-up signal WAKEUP is asserted at time $t_7$, the PMIC 200 enters a wake-up state. In the wake-up state, the power supply circuit assigned to the wake-up pin (wake-up signal WU) is activated. In this example, among the four-channel power supply circuits 250_1 to 250_4, the first to third channel power supply circuit 250_1 to 250_3 are assigned to the wake-up pin WU, and these power supply circuits 250_1 to 250_3 are activated during the wake-up state. This assignment is based on the first data D1[1] to D1[3] described above.

After activation delay times t_ondly1 to t_ondly3 have elapsed from the entry into the wake-up state, the respective power supply circuits 250_1 to 250_3 start activation. The activation delay times t_ondly1 to t_ondly3 are based on the second data D2[1] to D2[3] described above.

Active State ACTIVE

At time $t_8$ after the activation of all the power supply circuits 250_1 to 250_4 are completed, the reset signal RSTB is negated, and the PMIC 200 enters an active state ACTIVE.

The above is the activation sequence. Next, a shutdown sequence will be described.

Shutdown State SHTDNWU

When the wake-up signal WU is negated at time $t_9$, the PMIC 200 transitions to a shutdown state SHTDNWU. In the shutdown state SHTDNWU, the power supply circuits 250_1 to 250_3 allocated to the wake-up signal WU are sequentially shut down.

After stop delay times t_offdly1 to t_offdly3 have elapsed from the entry into the shutdown state SHTDNWU, the respective power supply circuits 250_1 to 250_3 starts to be shut down. The stop delay times t_offdly1 to t_offdly3 are based on the third data D3[1] to D3[3] described above.

When the power supply circuits 250_1 to 250_3 assigned to the wake-up signal WU are shut down, the PMIC 200 transitions to a startup state STARTUP at time $t_{10}$.

Shutdown State SHTDNEN

When the enable signal EN is negated at time $t_{11}$ in the startup state STARTUP, the PMIC 200 transitions to a shutdown state SHTDNEN. In the shutdown state SHTDNEN, the power supply circuit 250_4 allocated to the enable signal EN is shut down. In addition, in the shutdown state SHTDNEN, the internal regulators 270 and 272 stop and enter the standby state STBY.

If the wake-up signal WU is asserted in the startup state STARTUP, the PMIC 200 returns to time $t_7$.

Next, the sequence at the time of activation will be described in detail.

Figure 3:
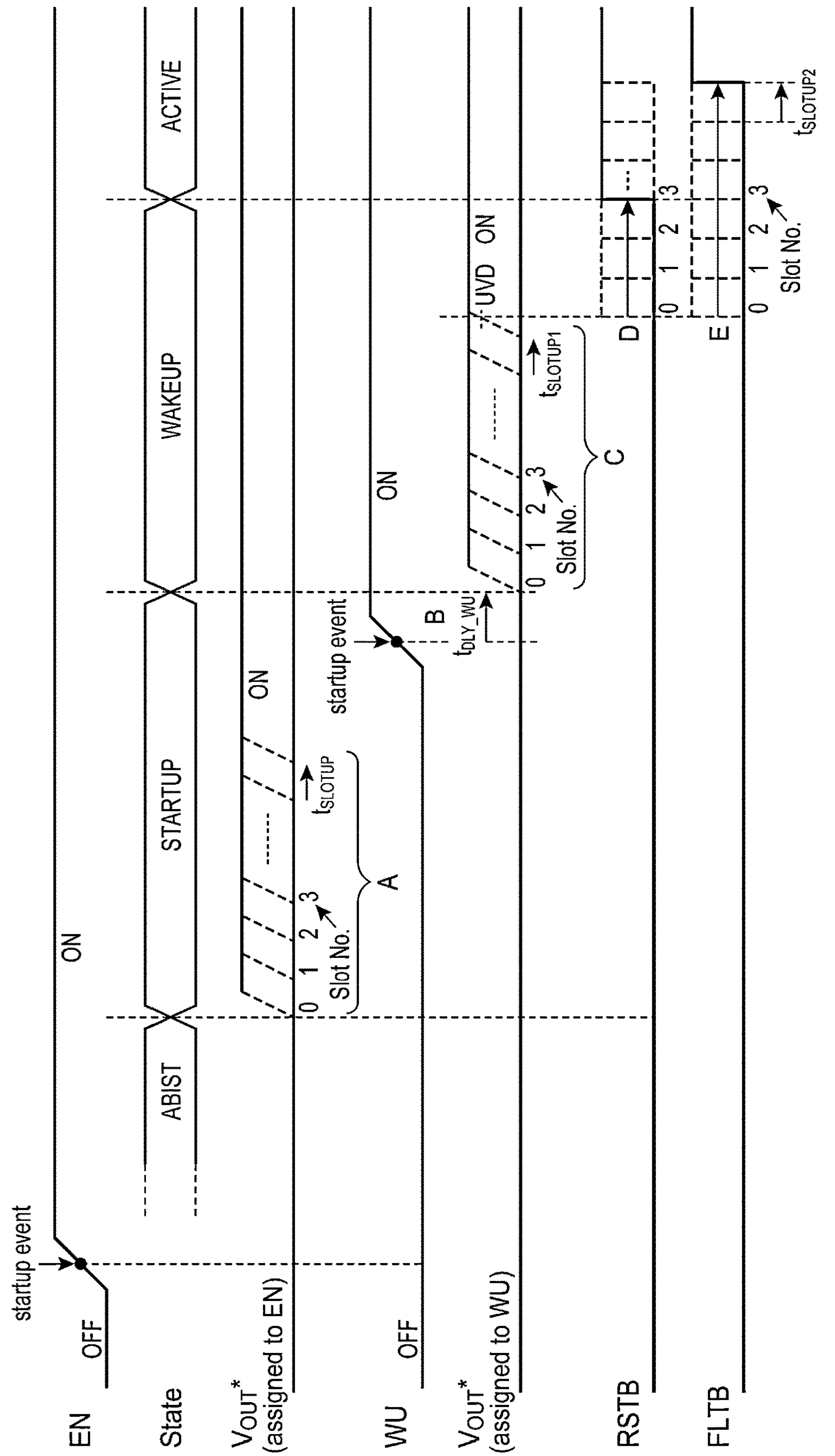
FIG. 3 is a diagram illustrating a sequence at the time when the PMIC is activated.

FIG. 3 is a diagram illustrating a sequence at the time when the PMIC 200 is activated. The power supply circuit 250 allocated to the enable signal EN is allocated to one of a plurality of time slots A based on the transition from the A-BIST state to the startup state STARTUP. A time slot interval $t_{SLOTUP}$ may be set by the setting data CONFIG.

The power supply circuit 250 assigned to the wake-up signal WU is assigned to one of a plurality of time slots C based on the assertion of the wake-up signal WU. A time slot interval $t_{SLOTUP1}$ may be set by the setting data CONFIG.

A delay time B is inserted between the assertion of the wake-up signal WU and the first time slot, and a length $t_{DLY\_WU}$ of the delay time may be set by the setting data CONFIG.

A plurality of time slots D and E are defined based on the completion of the activation of the last one of the power supply circuits allocated to the wake-up signal WU. A time slot interval $t_{SLOTUP2}$ may be set by the setting data CONFIG. The reset signal RSTB and the fault signal FLTB can be set to one of the time slots D and one of the time slots E, respectively.

Next, a sequence during shutdown will be described.

Figure 4:
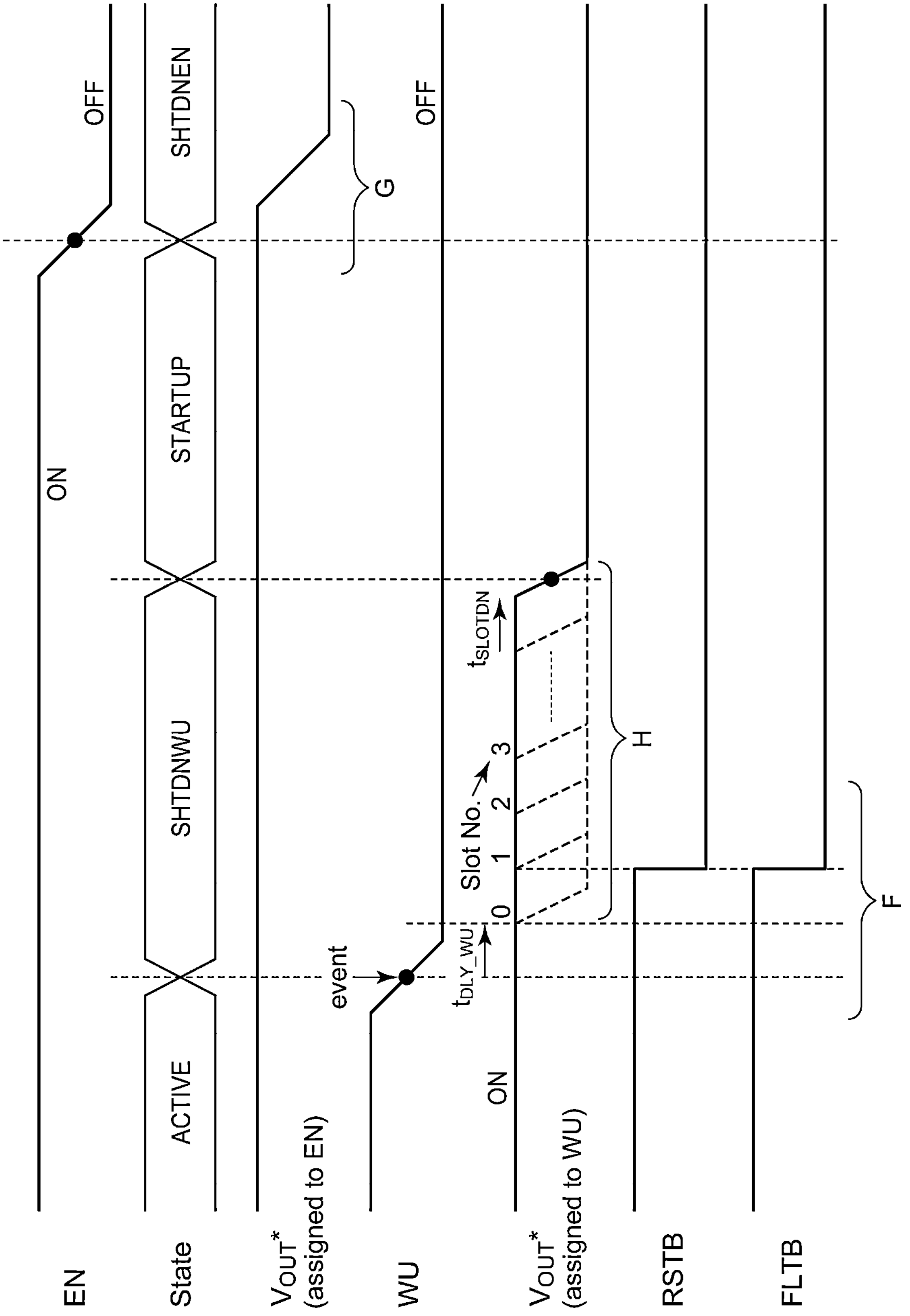
FIG. 4 is a diagram illustrating a sequence at the time when the PMIC is shut down.

FIG. 4 is a diagram illustrating a sequence at the time when the PMIC 200 is shut down. The power supply circuit 250 allocated to the wake-up signal WU is allocated to one of a plurality of time slots H based on the transition from the active state to the shutdown state SHTDNWU. A time slot interval $t_{SLOTDN}$ may be set by the setting data CONFIG.

A delay time is inserted between the negation of the wake-up signal WU and the first time slot H, and a length $t_{DLY\_WU}$ of the delay time may be set by the setting data CONFIG.

The assertion of the reset signal RSTB and the fault signal FLTB is assigned to one of the time slots F that is the same as the time slot H.

The power supply circuit 250 assigned to the enable signal EN is shut down substantially simultaneously with the negation of the enable signal EN. At this time, the internal regulators 270 and 272 are also shut down.

The above is the operation of the PMIC 200.

According to the PMIC 200, it is possible to change at least one of the order in which the plurality of power supply circuits 250 are activated and shut down and the timings when the plurality of power supply circuits 250 are activated and shut down according to the setting data CONFIG written in the nonvolatile memory 230, and it is possible flexibly cope with various required specifications.

Next, a specific configuration example of the sequencer 210 will be described.

Figure 5:
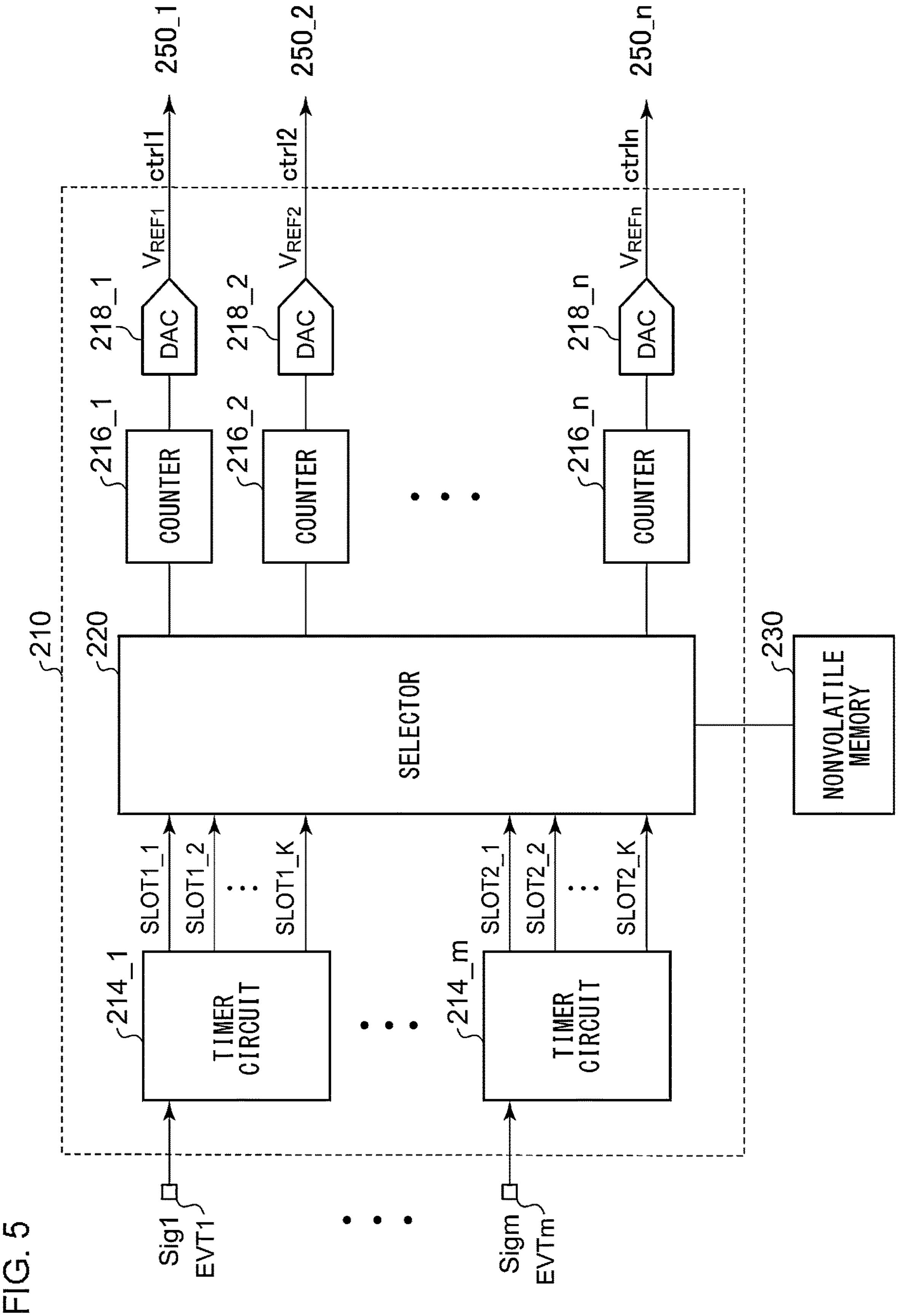
FIG. 5 is a circuit diagram illustrating a configuration example of a sequencer.

FIG. 5 is a circuit diagram illustrating a configuration example of the sequencer 210. The sequencer 210 includes m timer circuits 214_1 to 214_*m* corresponding to the m event signals Sig1 to Sigm. The i-th timer circuit 214_*i* generates timing signals SLOTi_1 to SLOTi_k defining a plurality of time slots with the assertion of the corresponding event signal Sigi as a trigger.

The n counters 216_1 to 216_*n* and the n D/A converters 218_1 to 218_*n* correspond to the plurality of power supply circuits 250_1 to 250_*n*.

A selector 220 supplies a corresponding one of the plurality of timing signals to each of the n counters 216_1 to 216_*n*. The counter 216_*i* counts up or counts down with the input timing signal as a trigger. The D/A converter 218_*i* converts the count value of the counter 216_*i* into an analog reference voltage $V_{REFi}$. This configuration enables a soft start operation. In this example, the reference voltage $V_{REFi}$ is supplied to the power supply circuit 250_*i* as a control signal ctrli of FIG. 1. The power supply circuit 250_*i* generates an output voltage $V_{OUTi}$ corresponding to the reference voltage $V_{REFi}$. When the D/A converter 218_*i* is mounted on the power supply circuit 250_*i* side, the count value of the counter 216_*i* becomes the control signal ctrli.

When the power supply circuit 250_*i* is stopped, the counter 216_*i* may count down to gradually decrease the reference voltage $V_{REFi}$ over time. Alternatively, the output voltage $V_{OUTi}$ of the power supply circuit 250_*i* may be changed to 0 V to stop the power supply circuit 250_*i* by resetting the counter 216_*i* to zero and changing the reference voltage $V_{REFi}$ to 0 V.

When it is desired to turn off the power supply circuit 250_*i* in a short time, a stop instruction may be given to the power supply circuit 250_*i* by adding a stop signal (enable signal) to the control signal ctrli separately from the reference voltage $V_{REFi}$, and changing the stop signal to a predetermined level. The power supply circuit 250_*i* is configured to immediately stop the output and the operation in response to the stop instruction.

Figure 6:
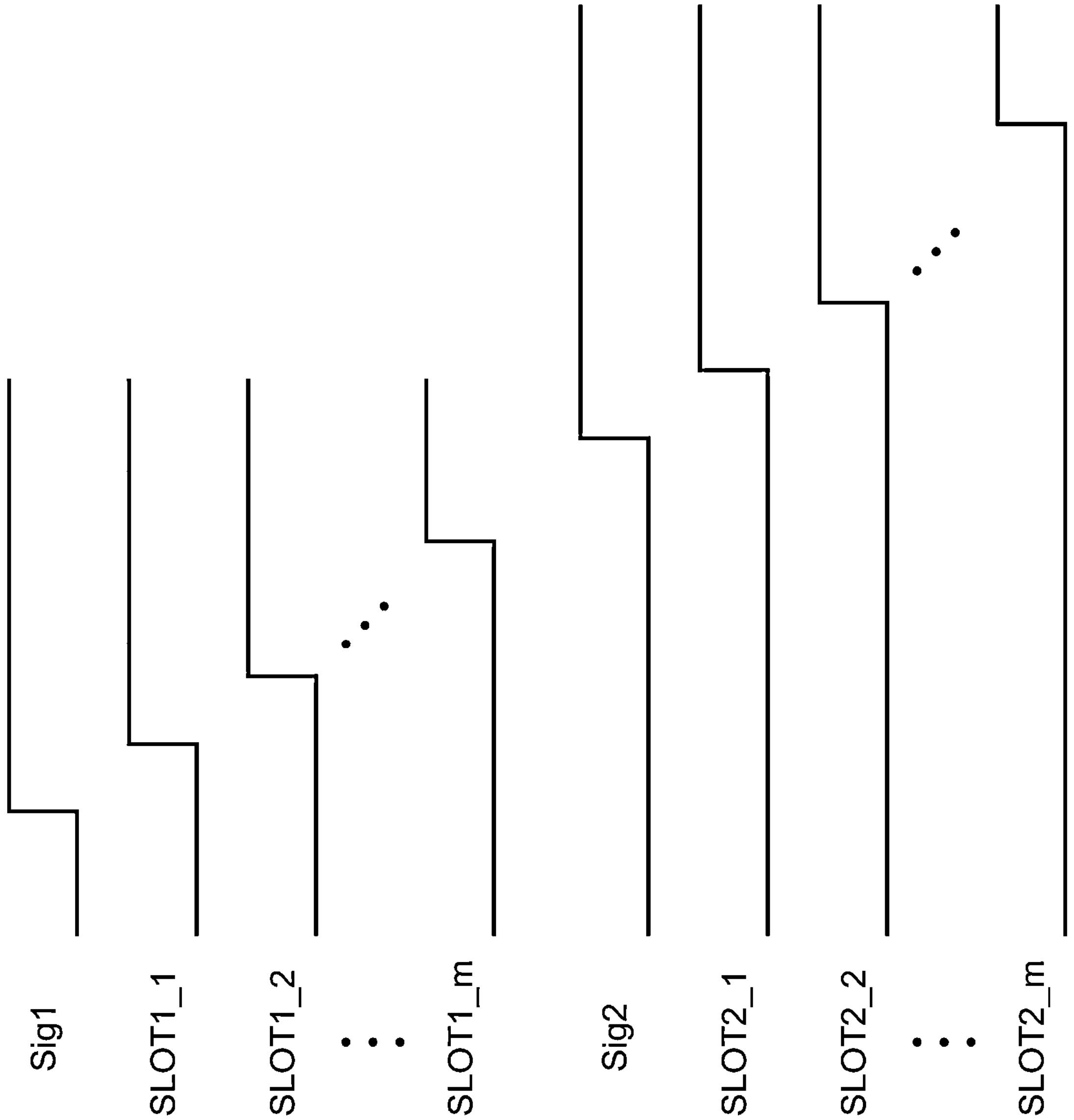
FIG. 6 is a waveform diagram of a plurality of timing signals generated by a timer circuit.

FIG. 6 is a waveform diagram of a plurality of timing signals generated by the timer circuits when m=2.

Figure 7:
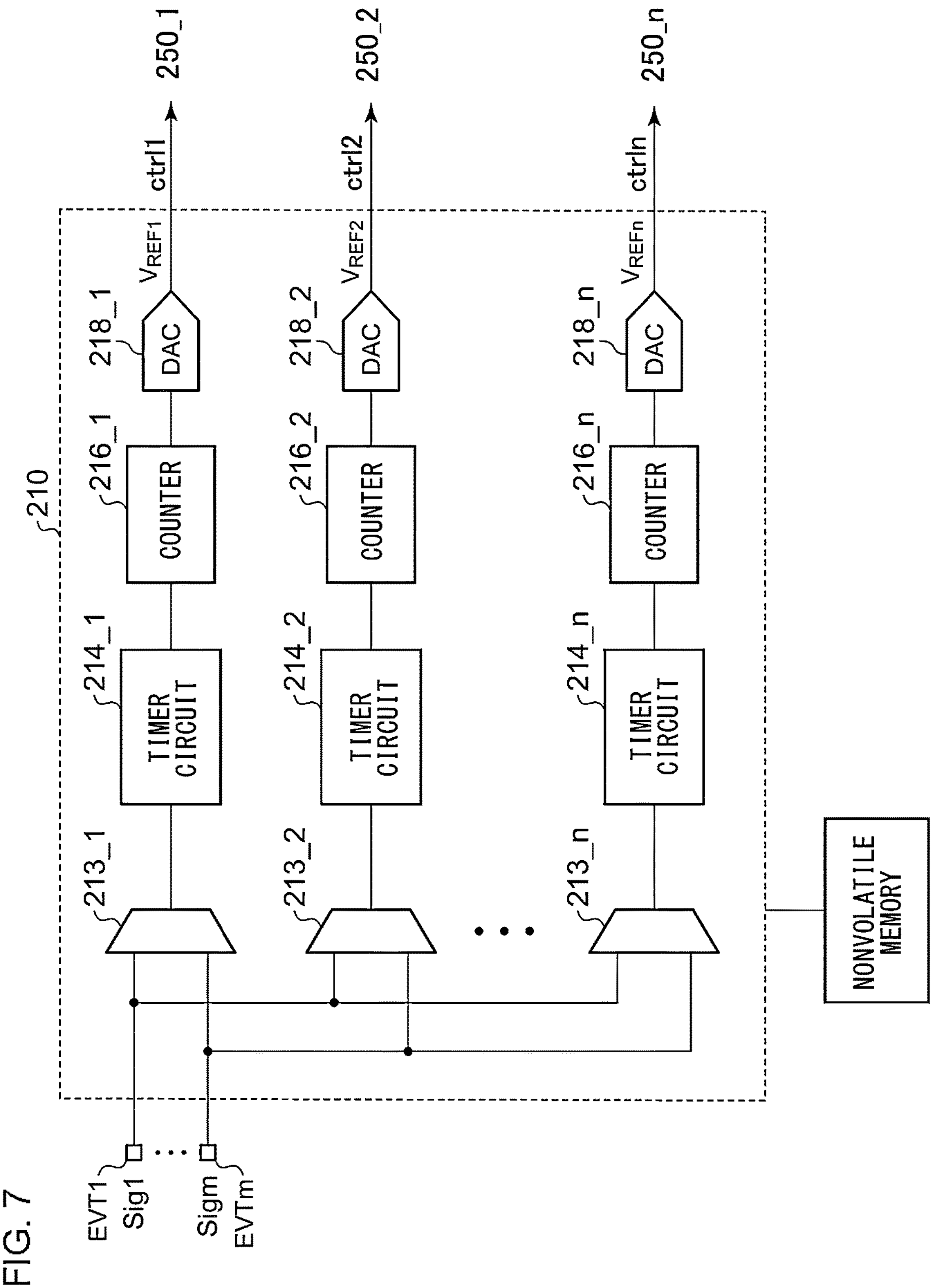
FIG. 7 is a circuit diagram illustrating another configuration example of a sequencer.

FIG. 7 is a circuit diagram illustrating another configuration example of the sequencer 210. The sequencer 210 includes a plurality of timer circuits 214_1 to 214_*n* and a plurality of selectors 213_1 to 213_*n* corresponding to the plurality of power supply circuits 250_1 to 250_*n*.

The selector 213_*i* selects one of the m event signals Sig1 to Sigm, and supplies the selected event signal to the timer circuit 214_*i*. The i-th timer circuit 214_*i* starts time measurement with the assertion (or the negation) of the corresponding event signal Sig as a trigger, and generates a start signal STARTi indicating a timing when the corresponding power supply circuit 250_*i* is started to be activated (shut down).

The counter 216_*i* counts up with the start signal STARTi as a trigger. The D/A converter 218_*i* converts the output of the counter 216_*i* into a reference voltage $V_{REFi}$. This configuration enables a soft start operation.

As described above, when the power supply circuit 250_*i* is stopped, the counter 216_*i* may count down to gradually decrease the reference voltage $V_{REFi}$ over time. Alternatively, the output voltage $V_{OUTi}$ of the power supply circuit 250_*i* may be changed to 0 V to stop the power supply circuit 250_*i* by resetting the counter 216_*i* to zero and changing the reference voltage $V_{REFi}$ to 0 V.

When it is desired to turn off the power supply circuit 250_*i* in a short time, a stop instruction may be given to the power supply circuit 250_*i* by adding a stop signal (enable signal) to the control signal ctrli separately from the reference voltage $V_{REFi}$, and changing the stop signal to a predetermined level. The power supply circuit 250_*i* is configured to immediately stop the output and the operation in response to the stop instruction.

Second Embodiment

Figure 8:
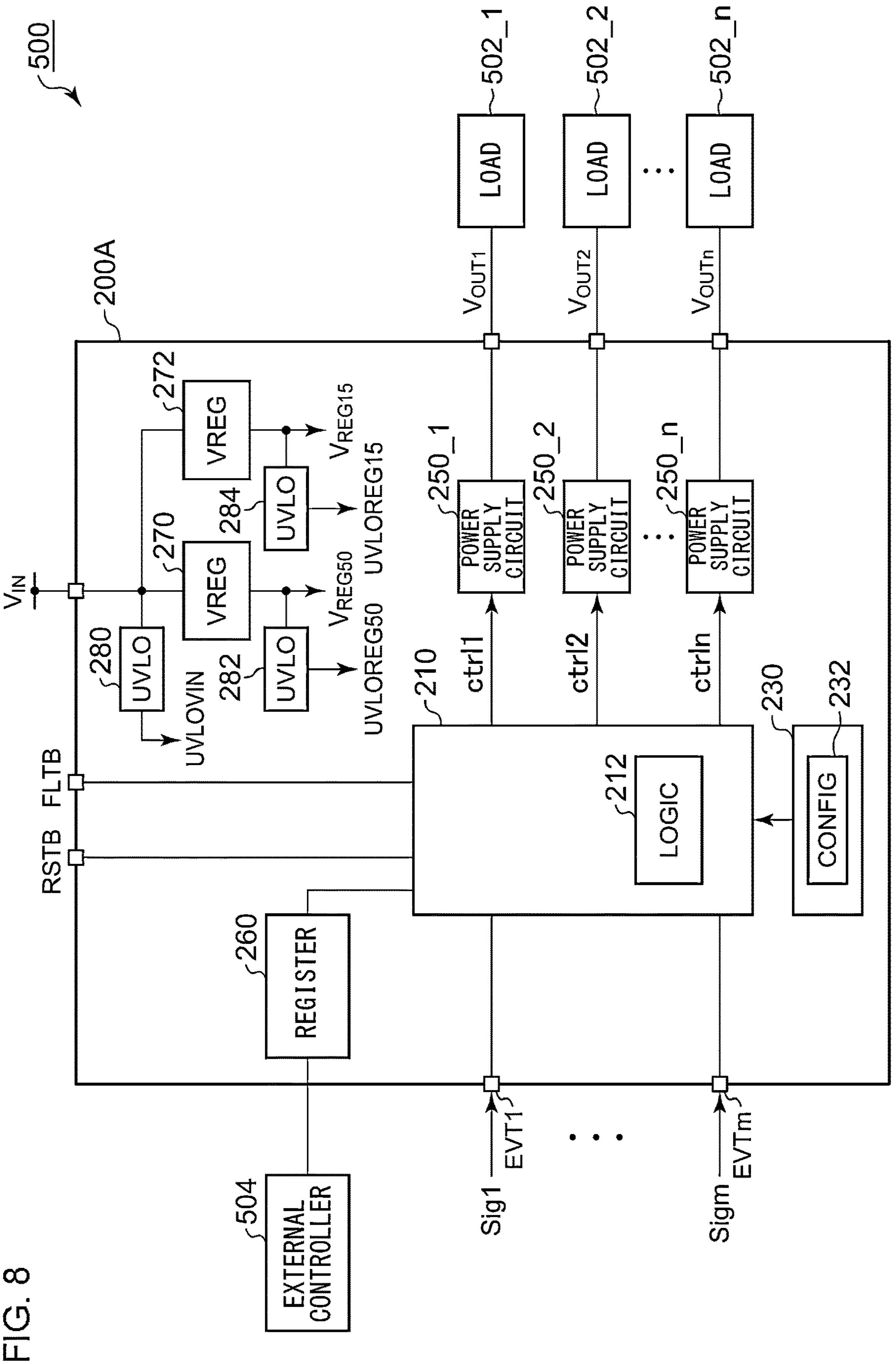
FIG. 8 is a circuit diagram of a PMIC according to a second embodiment.

FIG. 8 is a circuit diagram of a PMIC 200A according to a second embodiment. In the first embodiment, each of the plurality of power supply circuits 250_1 to 250_*n* is assigned to one of the plurality of control pins EVT1 to EVTm according to the first data D1[1] to D1[*n*]. On the other hand, in the second embodiment, none of the plurality of power supply circuits 250_1 to 250_*n* can be assigned to and associated with the plurality of control pins EVT1 to EVTm.

The PMIC 200A includes a register 260 that can be accessed by an external controller 504. The register 260 can store control signals CTRL[1] to CTRL[n] specifying whether to enable or disable the plurality of power supply circuits 250_1 to 250_*n*.

The sequencer 210 controls the power supply circuit 250_*j*, which is not allocated to any pin according to the first data D1, to be activated or stopped based on the control signal CTRL[j] stored in the register 260 regardless of an occurrence of an event, that is, regardless of the event signals Sig1 to Sigm.

According to the second embodiment, some of the plurality of power supply circuits 250_1 to 250_*n* can be arbitrarily turned on or off during the operation of the electronic device 500.

Modification

It is understood by those skilled in the art that the above-described embodiments are exemplary, and various modifications can be made to combinations of the components and the processes. Hereinafter, such modifications will be described.

In the first and second embodiments, the sequencer 210 is integrated together with the power supply circuits 250.

However, the present disclosure is not limited thereto, and only the sequencer 210 may be an independent IC.

It is to be understood by those skilled in the art that the embodiments are exemplary, various modifications can be made to the combinations of the components and the processes, and such modifications also fall within the present disclosure or the scope of the present disclosure.

Supplemental Note

In the present specification, the following technology is disclosed.

(Item 1)

A power management circuit including:

a sequencer including a logic circuit structured to control a plurality of power supply circuits to be activated or shut down;

a nonvolatile memory; and at least one control pin structured to receive at least one event signal, in which an operation of the sequencer is settable according to setting data stored in the nonvolatile memory.

(Item 2)

The power management circuit according to item 1, in which the at least one control pin includes a plurality of control pins, and the setting data includes first data specifying which one of the plurality of control pins each of the plurality of power supply circuits is assigned to.

(Item 3)

The power management circuit according to item 2, in which the plurality of control pins are two control pins.

(Item 4)

The power management circuit according to any one of items 1 to 3, in which the setting data includes second data specifying an activation start timing for each of the plurality of power supply circuits in association with assertion of a corresponding event signal.

(Item 5)

The power management circuit according to any one of items 1 to 4, in which the setting data includes third data specifying a shutdown start timing for each of the plurality of power supply circuits based on negation of a corresponding event signal.

(Item 6)

The power management circuit according to item 2 or 3, further including:

a register structured to be accessed by an external controller, in which the first data specifies which one of the plurality of control pins each of the plurality of power supply circuits is assigned to or is not assigned to, and a power supply circuit that is not assigned to any of the plurality of control pins is turned on or off according to a value of the register.

(Item 7)

The power management circuit according to any one of items 1 to 6, further including:

a reset pin, in which the sequencer negates a reset signal of the reset pin after the activation of the plurality of power supply circuits is completed, and the setting data includes fourth data defining a time until the reset signal is negated after the activation of the plurality of power supply circuits is completed.

(Item 8)

The power management circuit according to item 7, in which the at least one control pin includes a plurality of control pins, and when a predetermined one of the plurality of control pins is negated, the sequencer negates the reset signal after a lapse of a predetermined time.

(Item 9)

The power management circuit according to any one of items 1 to 8, further including:

a fault pin, in which the sequencer asserts a fault signal of the fault pin after the activation of the plurality of power supply circuits is completed, and the setting data includes fifth data defining a time until the fault signal is asserted after the activation of the plurality of power supply circuits is completed.

(Item 10)

The power management circuit according to item 9, in which the at least one control pin includes a plurality of control pins, and when a predetermined one of the plurality of control pins is negated, the sequencer negates the fault signal after a lapse of a predetermined time.

(Item 11)

The power management circuit according to any one of items 1 to 10, further including:

at least one timer circuit corresponding to the at least one event signal, in which the at least one timer circuit starts an operation with assertion of the corresponding event signal as a trigger, and asserts a time slot signal at a predetermined plurality of timings, and the plurality of power supply circuits are associated with one of the plurality of timings generated by the at least one timer circuit.

(Item 12)

The power management circuit according to any one of items 1 to 11, further including the plurality of power supply circuits.

(Item 13)

The power management circuit according to any one of items 1 to 12, in which the power management circuit is integrated on one semiconductor substrate.

(Item 14)

An electronic device including the power management circuit according to any one of items 1 to 13.

What is claimed is:

1. A power management circuit comprising:

a sequencer including a logic circuit structured to control start up and shutdown of a plurality of power supply circuits;

a nonvolatile memory; and a plurality of control pins, each of the plurality of control pins being associated with a different event, and each of the plurality of control pins being configured to receive an event signal that is asserted when the corresponding event occurs and is negated when the corresponding event ends, wherein a setting data stored in the nonvolatile memory includes first data specifying one or more power supply circuits assigned to each of the plurality of control pins, and wherein the sequencer is structured to, when an event signal input to any of the plurality of control pins is asserted, activate the one or more power supply circuits assigned to a control pin of the plurality of control pins according to a first predetermined sequence, and when the event signal input to any of the plurality of control pins is negated, shut down the one or more power supply circuits assigned to a control pin of the plurality of control pins according to a second predetermined sequence.

2. The power management circuit according to claim 1, wherein the plurality of control pins are two control pins.

3. The power management circuit according to claim 1, wherein the setting data includes second data specifying an activation start timing for each of the plurality of power supply circuits in association with assertion of a corresponding event signal.

4. The power management circuit according to claim 1, wherein the setting data includes third data specifying a shutdown start timing for each of the plurality of power supply circuits based on negation of a corresponding event signal.

5. The power management circuit according to claim 1, further comprising:

a register structured to be accessed by an external controller, wherein the first data specifies which one of the plurality of control pins each of the plurality of power supply circuits is assigned to or is not assigned to, and a power supply circuit that is not assigned to any of the plurality of control pins is turned on or off according to a value of the register.

6. The power management circuit according to claim 1, further comprising:

a reset pin, wherein the sequencer negates a reset signal of the reset pin after the activation of the plurality of power supply circuits is completed, and the setting data includes fourth data defining a time until the reset signal is negated after the activation of the plurality of power supply circuits is completed.

7. The power management circuit according to claim 6, wherein the at least one control pin includes a plurality of control pins, and when a predetermined one of the plurality of control pins is negated, the sequencer negates the reset signal after a lapse of a predetermined time.

8. The power management circuit according to claim 1, further comprising:

a fault pin, wherein the sequencer asserts a fault signal of the fault pin after the activation of the plurality of power supply circuits is completed, and the setting data includes fifth data defining a time until the fault signal is asserted after the activation of the plurality of power supply circuits is completed.

9. The power management circuit according to claim 8, wherein the at least one control pin includes a plurality of control pins, and when a predetermined one of the plurality of control pins is negated, the sequencer negates the fault signal after a lapse of a predetermined time.

10. The power management circuit according to claim 1, further comprising the plurality of power supply circuits.

11. The power management circuit according to claim 1, wherein the power management circuit is integrated on one semiconductor substrate.

12. An electronic device comprising the power management circuit according to claim 1.

13. The power management circuit according to claim 1, wherein the sequencer includes:

a selector structured to receive signals corresponding to the event signals; and a plurality of counters structured to count up or count down using a signal from the selector as a trigger.

14. The power management circuit according to claim 13, wherein the sequencer includes a plurality of timer circuits each configured to receive the event signal, wherein each of the plurality of timer circuits is configured to start an operation using assertion of the corresponding event signal as a trigger, and to assert time slot signals at a plurality of predetermined timings, and wherein the selector is configured to supply a corresponding one of the time slot signals to each of the plurality of counters.

* * * * *